May 5, 1925.  
F. X. LAUTERBUR  
DOUGH MOLDING MACHINE  
Filed Jan. 15, 1923  
1,537,018  
3 Sheets-Sheet 2

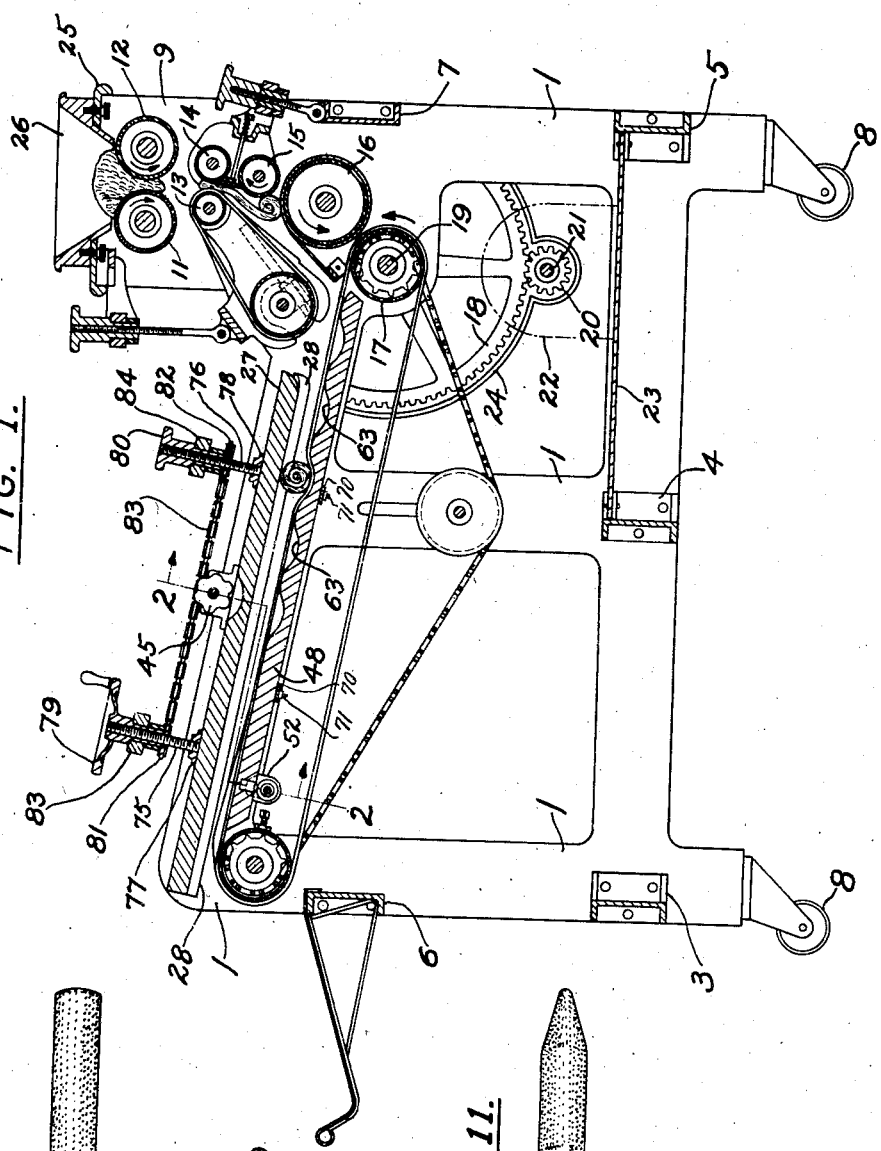

INVENTOR:  
FRANK X. LAUTERBUR,  
BY  
ATTORNEYS.

May 5, 1925.

F. X. LAUTERBUR 1,537,018

DOUGH MOLDING MACHINE

Filed Jan. 15, 1923      3 Sheets-Sheet 3

INVENTOR:
FRANK X. LAUTERBUR
BY Allen & Allen
ATTORNEYS.

Patented May 5, 1925.

1,537,018

UNITED STATES PATENT OFFICE.

FRANK X. LAUTERBUR, OF SIDNEY, OHIO.

DOUGH-MOLDING MACHINE.

Application filed January 15, 1923. Serial No. 612,703.

*To all whom it may concern:*

Be it known that I, FRANK X. LAUTERBUR, a citizen of the United States, and a resident of Sidney, in the county of Shelby and State of Ohio, have invented certain new and useful Improvements in Dough-Molding Machines, of which the following is a full, clear, and exact description, reference being had to the accompanying drawings, forming part of this specification.

My invention relates to dough molding machines, otherwise known as loaf forming machines, in which dough is rolled into shapes, either of cylindrical form or of other than cylindrical form, the latter generally being used in the making of Vienna bread and in which a quantity of prepared dough is rolled, curled, kneaded and shaped by automatic means.

In the patents granted to me January 4, 1916, No. 1,167,187, January 18, 1921, No. 1,366,266, and October 24, 1922, No. 1,432,874, I have shown and described mechanisms for rolling, curling, and kneading the dough on the same general plan as is adopted in the present invention, and reference is hereby made to these patents for an explanation of the various functions of such machines in their more general aspects.

My present invention embodies adjustable mechanism whereby the shape of the loaf may be adapted to the making of special shapes of bread, such as Vienna bread, as well as the making of so called standard style loaves, used in making of "pan bread".

It is the object of the invention to provide a dough molding machine capable of ready and simple adjustment, so that the change from the standard style loaf to the Vienna shaped style loaf may be quickly and efficiently made, allowing ample adjustability.

A further object is to provide a kneading board that kneads the dough loaf in precisely the same way as done by hand, and "points" or tapers the ends without injury to the material.

To the accomplishment of the said above and related ends, said invention, then consists in the construction and novel combination of parts hereinafter fully described, illustrated in the accompanying drawings, and particularly pointed out in the claims hereto appended; it being understood that various changes in the form, proportion, size and minor details of construction, within the scope of the claims, may be resorted to without departing from the spirit or sacrificing any of the advantages of the invention.

Referring to the drawings:—

Figure 1 is a central longitudinal sectional view of a dough molding machine constructed in accordance with this invention.

Figure 10 is a perspective view of a standard style loaf.

Figure 11 is a perspective view of a Vienna style load.

Figure 12 is a like view to Figures 10 and 11, showing a Vienna dough loaf in the process of being molded.

Figure 3:
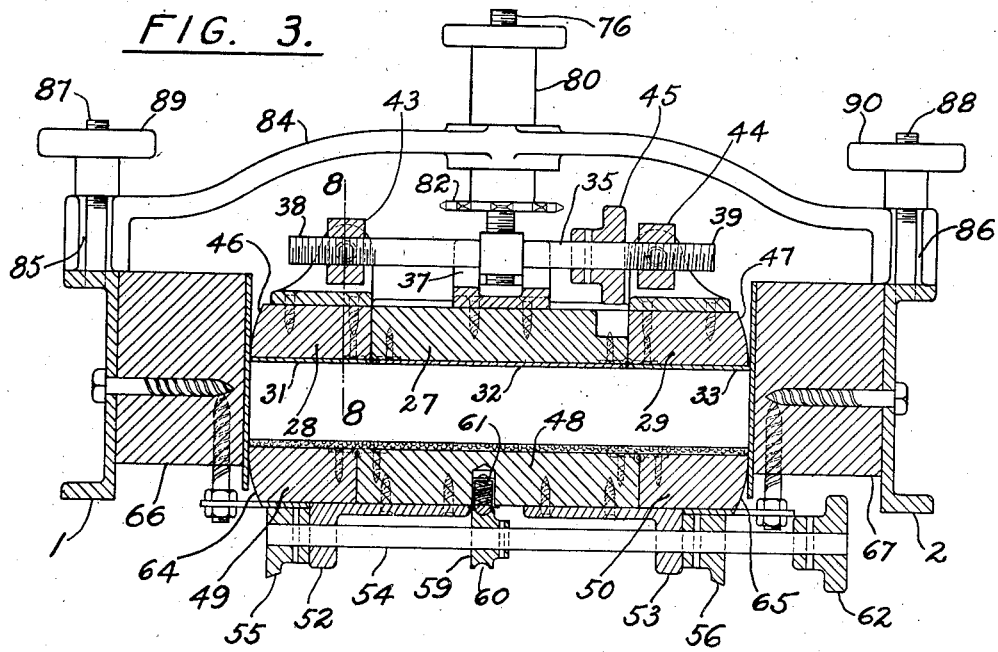
Figure 3 is a similar transverse sectional view, but shows the machine arranged for standard dough loaves instead of Vienna dough loaves.

In the accompanying drawings in which is illustrated the preferred embodiment of the invention, the main frame of the dough molding machine comprises in its construction spaced sides 1 and 2, suitably connected by transverse frame members 4, 5, 6, and 7, and preferably mounted on rollers or wheels 8, to render it portable. The sides of the frame are provided at one end with integral vertical columns 9, preferably hollowed at their upper portions to provide a gear case of suitable construction for housing the gears that operate the feed rolls 11, and 12, the pressure rolls 13, and 14, the forming or coiling rolls 15, and 16, and the conveyor belt drive roll 17. The said gears are similar to those shown and described in my Patent No. 1,167,187 dated January 4, 1916, and Patent No. 1,432,874, dated October 24, 1922, and hence are not shown in detail. A gear 18 is shown as supplying rotary motion to a shaft 19, on the end of said shaft 19 having a mating gear that drives the gear train, operating rolls 11, 12, 13, 14, 15, 16, 17, above referred to; said mating gear and the said gear train, being of any familiar construction, are not shown in detail.

Motive power is supplied to the gear 18 by means of a pinion 20 shown mounted on a shaft 21. This shaft 21 may be the drive shaft of an electric motor 22 (shown in construction lines), mounted on a base plate 23 secured to the frame members 4 and 5. A guard 24 protects the gears 18 and 20.

The columns 9 and 10 are connected by a horizontal top portion or plate 25 having a central oblong opening into which extends an adjustably mounted hopper 26, provided with downwardly tapered sides, and extending downwardly to within a short distance of the feed rolls 11 and 12.

Figure 4:
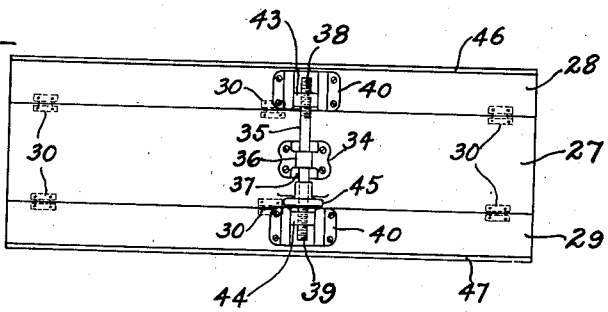
Figure 4 is a plan view of the adjustable pressure board.

The adjustable pressure board (Figure 4) comprises a central part 27 and two side parts 28 and 29 adjustably mounted on part 27 by means of hinges 30. I prefer to line the parts 27, 28, and 29 with metal liners 31, 32, and 33. A bracket 34 is rigidly mounted on the central part 27 in which operates an adjustment screw 35 provided with an enlayed part 36 which fits in mating slots 37 of the bracket 34. The adjustment screw 35 has right and left hand threaded ends 38 and 39 respectively.

The side parts 28 have brackets 40 rigidly fastened thereto in which are loosely mounted the swivel screws 41 and 42. These said swivel screws are secured in swivel blocks 43 and 44. As the adjustment screw 35 is rotated the side parts 28 and 29 are adjusted to suit.

Figure 2:
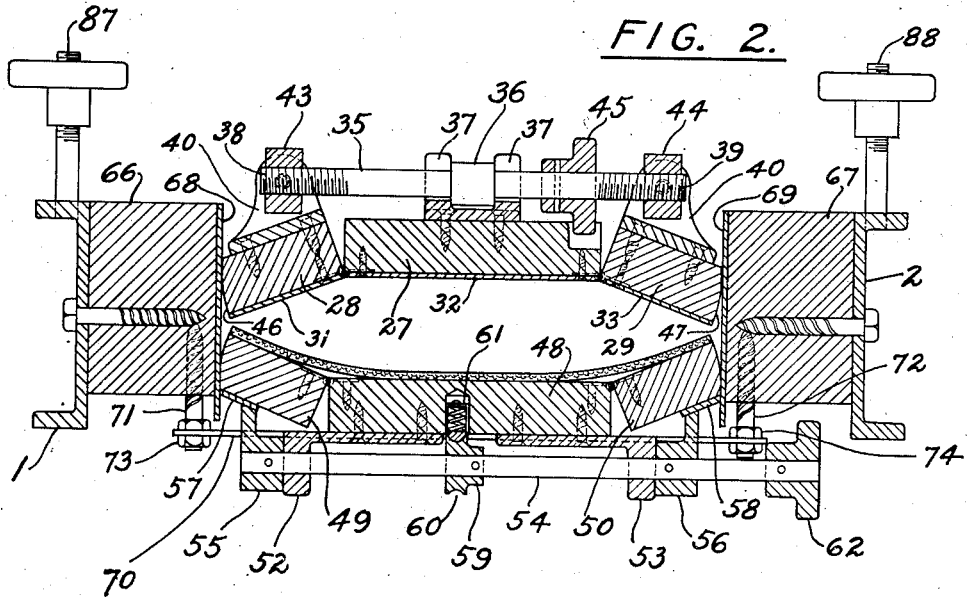
Figure 2 is a transverse sectional view on the line 2—2, of Figure 1.

In Figure 3 it will be seen that the adjustment screw is turned so that the pressure board is straight across (used in this position for standard loaves) and in Figure 2 it will be seen that the adjustment screw 35 is turned so that the pressure board has slanting sides (used in this position for Vienna loaves). For convenience in rotating the adjustment screw 35, I have shown a hand wheel 45 rigidly attached to said adjustment screw. The edges of the side parts 28 and 29 are rounded to a radius with the hinges 30 as denoted by 46 and 47 so that said side parts do not bind as they are raised and lowered.

Figure 7:
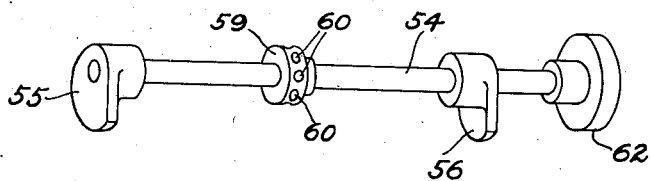
Figure 7 is a perspective view of the shaft and mechanism for adjusting the kneading board.
Figure 6:
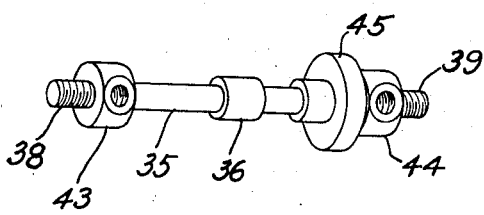
Figure 6 is a perspective view of the cams and shaft for adjusting the pressure board.
Figure 8:
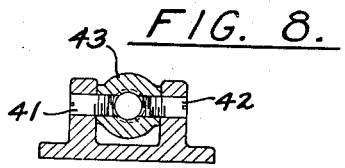
Figure 8 is a transverse section through the swivel block and bracket on the line 8—8, Figure 3.
Figure 9:
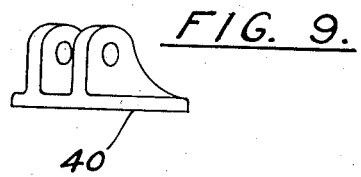
Figure 9 is a perspective view of the swivel block bracket shown in section in Figure 8.

The adjustable kneading board 48 (Figure 5) is provided with parts 49 and 50 adjustably mounted on the board 48 by means of hinges 51. Brackets 52 and 53 are rigidly mounted on the kneading board 48 in which operates an adjustment shaft 54. Cams 55 and 56 are rigidly fastened to the shaft 54 (see Figure 7), and serve to raise the adjustable parts 49 and 50, said adjustable parts assuming their downward position by gravity as the cams are lowered. Wearing plates 57 and 58 are provided to eliminate excessive wear.

To hold the adjustment of the parts 49 and 50 intact, I provide a fixed collar 59 provded with a series of holes 60 into which holes a spring plunger 61 engages as the shaft 54 is rotated, the spring plunger 61 being forced upward and out of the holes 60. A hand wheel 62 is rigidly fastened to the shaft 54 for convenient operation The upper surface of the kneading board 48 is provided for a portion of its length only with a transversely straight and longitudinal undulatory or waved kneading surface 63, presenting a sinuous or serpentine contour composed of alternate convex and concave portions. The sides of the parts 49 and 50 are rounded to a radius with the hinges 51 as denoted at 64 and 65 so that said parts do not bind as they are raised and lowered.

Spaced side blocks or boards 66 and 67 are secured to the spaced sides 1 and 2 by screws or other suitable means and are provided with wearing plates 68 and 69. These side blocks may be of any thickness to suit conditions, as I find it better to make my improved dough molding machine of a standard width, while the pressure and kneading boards are made of widths to suit the length of the loaves desired, and this necessitates the blocks 66 and 67 being made of varying widths to suit the specific case, said side blocks are substantially the same length as the kneading board 48.

The kneading board 48 is set in a relatively fixed position, and secured to the spaced sides or other suitable parts. I have shown said kneading board as attached to the side blocks 66 and 67 by means of a plurality of straps 70 mounted on studs 71 and 72. By means of adjusting nuts 73 and 74 on the studs 71 and 72 the kneading board is easily adjusted to its exact position, and furthermore, by loosening the lower adjusting nuts 73 and 74 the entire kneading board and coacting parts may be completely removed. I find this method of mounting the kneading board very convenient and believe it to be novel.

It will be noted from the drawings (see Figures 1 and 3) that the pressure board is provided with means to raise and lower it, and this adjustment is necessary to accommodate the different weights of dough to be used. To the accomplishment of this and related ends I provide threaded studs 75 and 76 fastened in brackets 77 and 78 mounted on the top of the pressure board 48. Adjusting hand wheels 79 and 80 carry sprockets 81 and 82 at their lower ends over which operates an endless chain 83. The hand wheels 79 and 80 are loosely mounted in cross arms 83 detachably mounted on the spaced sides 1 and 2. The holes 84 form bearings for the hand wheels 79 and 80 and the slotted holes 85 and 86 form ready detachable mounting means. Threaded studs 87 and 88 are securely fastened in the spaced sides 1 and 2 and engage the slotted holes 85 and 86, and hand wheels 89 and 90 are mounted on the threaded portions of studs 87 and 88 to serve as clamp means to hold the cross arms 83 rigid.

The operation of the machine except as noted in the above description is the same as my former machines to which reference has been made. In the present machine, the action of the upper board and lower board between which the coil of dough is rolled, when arranged to be parallel throughout, is the same as in my former machines and produces a loaf such as is shown in Figure 10.

When the sides of the pressure board are turned down and the triangular side pieces to the kneading board are turned up a loaf as shown in Figure 11 is formed.

Figure 5:
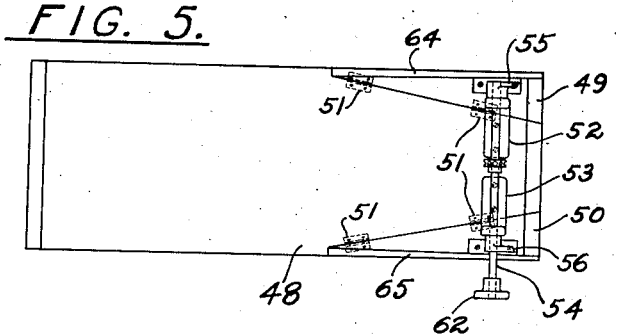
Figure 5 is a bottom view of the adjustable kneading board.

Until the loaf strikes the turned up sides of the kneading board it has a conformation such as is shown in Figure 12. The action of the kneading board in forming a taper out of the end of the loaf is gradually applied, with the result of working the dough into the form shown in Figure 11 and not merely forcing it to the said form. The gradual application of the lower angular surface by the triangular side pieces, 49 and 50, as can best be seen in Figure 5, is to work on the dough from the ends inwardly with a gradually increasing angular surface area.

This action I find advantageous to the end that the so-called Vienna loaves are formed in a permanent manner. In my opinion it would not be practical to suddenly compress the dough as treated in my machine above described into the Vienna shape, as it would be likely to distort when delivered from the machine, because of its inherent elasticity.

The means devised for controlling the sides of the pressure board and the kneading board and the means for mounting, controlling and adjusting it, are the features of novelty relied upon by me. By "boards" in the claims I wish to include any of the usual shapes and usual types of material such as metal, fibre and wood, which may be used as confining elements against passage of dough in machines of the character noted.

Having thus described my invention, what I claim as new and desire to secure by Letters Patent is:—

1. In a loaf molding machine the combination with a conveyor belt or the like, of a pair of boards or the like facing each other between which the conveyor passes, both of said boards having desired areas at the sides thereof, adjustable away from the parallel, whereby a mass of dough carried along by the belt will be formed into a cylindrical body with tapered ends.

2. In a loaf molding machine of the character described, the combination of a kneading board and a pressure board, said two boards having portions at the sides thereof, articulated with the central parts thereof, and means for retaining said portions in adjusted position, bent away from the central parts.

3. In a loaf molding machine of the character described, a pressure board, said board having its sides articulated with relation to its center, and common means permanently and adjustably engaging the two sides, to adjust their angularity with relation to the center, whereby the relative angularity of the two sides will be maintained as equal on both sides of the board.

4. In a loaf molding machine of the character described, a pressure board, said board having its sides articulated with relation to its center, interally threaded means pivotally mounted on the two sides, and a right and left hand screw engaging in said internally threaded means, for adjusting the angularity of said sides with relation to the middle.

5. In a loaf molding machine of the character described, a kneading board, and a pressure board, said pressure board having tiltable sides, and said kneading board having tiltable sides throughout a portion of its area, said sides having a substantially triangular shape.

6. In a machine of the character described, the combination with a conveyor belt or the like, of a pair of boards between which the conveyor passes, one of said boards having an undulatory surface toward the belt, at the receiving end, and tiltable sides at the delivery end, and the other of said boards having a surface parallel at its central portions with the other board, and with tiltable sides.

7. In a machine of the character described, the combination with a conveyor belt or the like, of a pair of boards between which the conveyor passes, one of said boards having an undulatory surface toward the belt, at the receiving end, and tiltable sides at the delivery end, and the other of said boards having a surface parallel at its central portions with the other boards, and with tiltable sides, said tiltable sides on the delivery end of the board first mentioned, beginning at the sides edges of the said board and tapering to a greater width toward the delivery end thereof.

8. In a loaf molding machine the combination with a frame-work, of a kneading board to be mounted therein, a belt or the like serving as a conveyor and passing over the upper surface of said board, and straps or the like extending laterally from the board, and threaded members set into the frame and depending therefrom, said straps engaging over the threaded members and nuts on said threaded members to engage and support the straps thereby serving to locate said board, and adjust its position on said threaded members and hence on the frame.

9. In a machine of the character described, the combination with a kneading board or the like, of articulated sides for said board, journals on the board, a shaft in said journals having cams bearing on said sides, and a spring catch to retain said shaft in a plurality of positions of adjustment of said cams upon said sides.

FRANK X. LAUTERBUR.